United States Patent
Zhang

(10) Patent No.: US 12,434,662 B2
(45) Date of Patent: Oct. 7, 2025

(54) VEHICLE, VEHICLE CONTROL METHOD, METHOD FOR RECOGNIZING GESTURE MADE OUTSIDE VEHICLE

(71) Applicant: PATEO CONNECT+ Technology (Shanghai) Corporation, Shanghai (CN)

(72) Inventor: Yu Zhang, Shanghai (CN)

(73) Assignee: PATEO CONNECT+ Technology (Shanghai) Corporation, Shanghai (CN)

( * ) Notice: Subject to any disclaimer, the term of this patent is extended or adjusted under 35 U.S.C. 154(b) by 245 days.

(21) Appl. No.: 17/980,244

(22) Filed: Nov. 3, 2022

(65) Prior Publication Data

US 2023/0192030 A1     Jun. 22, 2023

(30) Foreign Application Priority Data

Dec. 16, 2021   (CN) .......................... 202111561601.6

(51) Int. Cl.
  *B60R 25/20*   (2013.01)
  *G01S 15/62*   (2006.01)

(52) U.S. Cl.
  CPC .......... *B60R 25/2045* (2013.01); *G01S 15/62* (2013.01)

(58) Field of Classification Search
  CPC ..... B60R 25/2045; B60R 16/02; G01S 15/62; G01S 7/52004; G01S 7/539; G01S 15/66; G01S 15/88; B60Q 1/00; E05F 15/60; E05Y 2900/55
  See application file for complete search history.

(56) References Cited

U.S. PATENT DOCUMENTS

| | | | |
|---|---|---|---|
| 6,488,639 B1 | 12/2002 | Ribault et al. | |
| 10,466,772 B2* | 11/2019 | Trotta | ................... B60R 16/037 |
| 11,463,122 B2* | 10/2022 | Yun | ........................ H04B 1/401 |
| 2007/0197914 A1 | 8/2007 | Kosaku | |

(Continued)

FOREIGN PATENT DOCUMENTS

| | | |
|---|---|---|
| CN | 2726638 Y | 9/2005 |
| CN | 103750861 A | 4/2014 |

(Continued)

OTHER PUBLICATIONS

Machine translation and original of EP2746805A1 (Year: 2014).*
Machine translation and original of WO2020165323A1 (Year: 2020).*

*Primary Examiner* — Frederick M Brushaber
(74) *Attorney, Agent, or Firm* — ANOVA LAW GROUP, PLLC

(57) ABSTRACT

A method for recognizing a gesture made outside a vehicle includes setting a frequency of an ultrasound based on a thickness of a vehicle shell of the vehicle and an attenuation coefficient of the vehicle shell, emitting a plurality of ultrasounds having the frequency outwardly from an inner side of the vehicle shell, receiving a plurality of reflected waves returned by an obstacle reflecting the plurality of ultrasounds, determining whether the obstacle is a hand according to time differences between emission times of the plurality of ultrasounds and reception times of the plurality of reflected waves corresponding to the plurality of ultrasounds, and recognizing the gesture of the hand in response to determining that the obstacle is the hand.

20 Claims, 4 Drawing Sheets

(56) References Cited

U.S. PATENT DOCUMENTS

| | | | |
|---|---|---|---|
| 2012/0249291 A1* | 10/2012 | Holcomb | G07C 9/00563 340/5.51 |
| 2015/0061696 A1* | 3/2015 | Dahmani | G01R 31/1209 73/645 |
| 2016/0041024 A1* | 2/2016 | Reimer | G01F 23/2962 73/290 V |
| 2016/0083995 A1* | 3/2016 | Dezorzi | B60R 25/01 340/5.72 |
| 2016/0280129 A1* | 9/2016 | Newbound | B60Q 3/51 |
| 2017/0059697 A1* | 3/2017 | Esmail | G10K 11/004 |
| 2017/0197636 A1* | 7/2017 | Beauvais | B60R 25/257 |
| 2017/0232932 A1* | 8/2017 | Nishidai | B60R 25/2054 340/5.61 |
| 2017/0306684 A1 | 10/2017 | Baruco et al. | |
| 2018/0236972 A1* | 8/2018 | Linden | B60R 25/01 |
| 2018/0266165 A1* | 9/2018 | Dezorzi | G07C 9/28 |

FOREIGN PATENT DOCUMENTS

| | | | | |
|---|---|---|---|---|
| CN | 105324185 A | 2/2016 | | |
| CN | 105683777 A | 6/2016 | | |
| CN | 106301606 A | 1/2017 | | |
| CN | 107867129 A | 4/2018 | | |
| CN | 108509023 A | 9/2018 | | |
| CN | 109774641 A | 5/2019 | | |
| CN | 112040468 A | 12/2020 | | |
| CN | 113561911 A | 10/2021 | | |
| DE | 102015105672 A1 | 10/2016 | | |
| DE | 102016209991 A1 | 12/2017 | | |
| EP | 2746805 A1 * | 6/2014 | | B60Q 3/74 |
| JP | 2005068640 A | 3/2005 | | |
| WO | WO-2020165323 A1 * | 8/2020 | | |

* cited by examiner

VEHICLE, VEHICLE CONTROL METHOD, METHOD FOR RECOGNIZING GESTURE MADE OUTSIDE VEHICLE

CROSS-REFERENCE TO RELATED APPLICATION

This application claims priority to Chinese Patent Application No. 202111561601.6, filed on Dec. 16, 2021, the entire content of which is incorporated herein by reference.

TECHNICAL FIELD

The present disclosure relates to the vehicle field and, more particularly, to a method for recognizing a gesture made outside of a vehicle, a vehicle control method by using the method for recognizing the gesture, and the vehicle controlled by the gesture.

BACKGROUND

A plurality of operations usually need to be performed on different components of the vehicle, e.g., opening and closing a window, opening and closing a front or rear trunk hood, controlling vehicle light, and switching music. Often a user needs to enter the vehicle to touch a corresponding button or panel to perform these operations or perform these operations by a vehicle key or an application (APP) of a smartphone.

However, the above control method is time-consuming and labor-intensive, which diminishes user experience and increases operational complexity. To solve this problem, a vehicle control method through a user gesture is developed.

SUMMARY

Embodiments of the present disclosure provide a method for recognizing a gesture made outside a vehicle. The method includes setting a frequency of an ultrasound based on a thickness of a vehicle shell of the vehicle and an attenuation coefficient of the vehicle shell, emitting a plurality of ultrasounds having the frequency outwardly from an inner side of the vehicle shell, receiving a plurality of reflected waves returned by an obstacle reflecting the plurality of ultrasounds, determining whether the obstacle is a hand according to time differences between emission times of the plurality of ultrasounds and reception times of the plurality of reflected waves corresponding to the plurality of ultrasounds, and recognizing the gesture of the hand in response to determining that the obstacle is the hand.

Embodiments of the present disclosure provide a vehicle control method. The method includes setting a frequency of an ultrasound based on a thickness of a vehicle shell of a vehicle and an attenuation coefficient of the vehicle shell, emitting a plurality of ultrasounds having the frequency from an inner side of the vehicle shell, receiving a plurality of reflected waves returned by an obstacle reflecting the plurality of ultrasounds, determining whether the obstacle is a hand according to time differences between emission times of the plurality of ultrasounds and reception times of the plurality of reflected waves corresponding to the plurality of ultrasounds, determining a location of the hand and recognizing a gesture of the hand in response to determining that the obstacle is the hand, and performing a command based on the location of the hand and the gesture of the hand to control the vehicle.

Embodiments of the present disclosure provide a vehicle, including a vehicle shell, at least one ultrasound array, and a controller. The at least one ultrasound array is located on an inner side of the vehicle shell. The at least one ultrasound array emits a plurality of ultrasounds with a specific frequency to outside of the vehicle shell and receives a plurality of reflected waves reflected back by an obstacle. The controller is communicatively connected to the at least one ultrasound array and configured to set the specific frequency of the plurality of ultrasounds based on a thickness of the vehicle shell and an attenuation coefficient of the vehicle shell, determine whether the obstacle is a hand according to time differences between emission times of the plurality of ultrasounds and reception times of the plurality of reflected waves corresponding to the plurality of ultrasounds, and determine a location of the hand and recognize a gesture of the hand in response to determining that the obstacle is the hand.

DETAILED DESCRIPTION OF THE EMBODIMENTS

Figure 1:
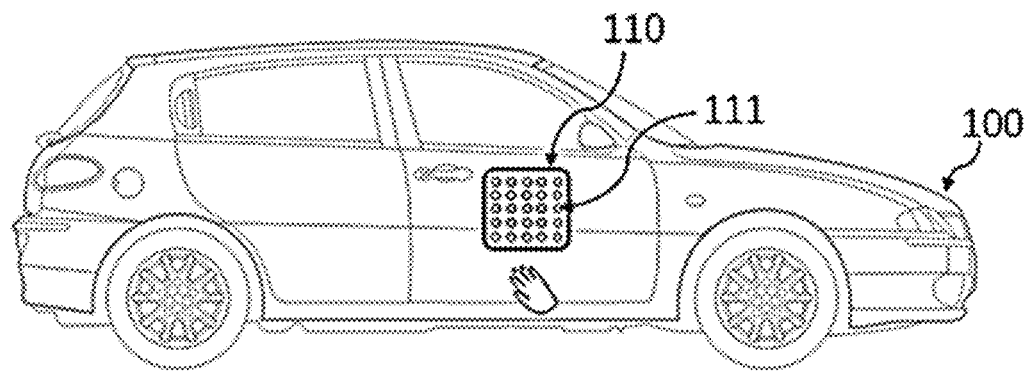
FIG. 1 is a schematic diagram showing a scene of recognizing a gesture made outside a vehicle according to some embodiments of the present disclosure.

In order to better understanding the present disclosure, various aspects of the present disclosure may be described in more detail with reference to the accompanying drawings. These detailed descriptions are merely illustrative of exemplary embodiments of the present disclosure and are not intended to limit the scope of the present disclosure in any way. In the following description, for explanation, many specific details may be set forth to provide a thorough understanding of embodiments of the present disclosure. However, apparently, embodiments of the present disclosure may be implemented without these specific details or with one or more equivalent arrangements. In some other embodiments, a well-known structure and device may be shown in block diagram form to avoid unnecessarily obscuring embodiments of the present disclosure.

As used herein, "about" or "approximately" may include a stated value and an average value of a specific value in an acceptable error range determined by those of ordinary skill in the art when considering an error related to a discussed value and a measurement of the specific value (i.e., a limitation of a measurement system). For example, "about" may mean within one or a plurality of standard deviations, or within ±30%, ±20%, ±10%, and ±5% of the stated value.

Unless otherwise specified, all terms (including engineering and scientific terms) used herein have the same meaning as commonly understood by those of ordinary skill in the art. Unless expressly stated in the present disclosure, words defined in a commonly used dictionary should be understood as having meanings consistent with their meanings in the context of the related technology, rather than being explained in an idealized or excessively formal manner.

Embodiments of the present disclosure and features of embodiments may be combined with each other when there is no conflict. In addition, unless clearly defined or contradicted by the context, specific steps included in the method of the present disclosure are not necessarily limited to a described order and may be performed in any order or in parallel.

The above description is merely embodiments of the present disclosure and an explanation of an applied technical principle. Those skilled in the art should understand that the scope of the present disclosure is not limited to the technical solutions formed by a specific combination of the above-mentioned technical features, and should also cover, without departing from the technical concept, other technical solutions formed by combining the above-mentioned technical features or equivalent features of the technical features in any form. For example, a technical solution may be formed by replacing an above feature with a technical feature disclosed in the present disclosure (but not limited to) with a similar function. The present disclosure will be described in detail below with reference to the accompanying drawings and in connection with embodiments of the present disclosure.

An ultrasound may not be interrupted by weather, temperature, humidity, air pressure, light intensity, and electromagnetic radiation except for another ultrasound with a similar frequency. Thus, ultrasound may be applied in the field of detection and recognition. A method of detecting a gesture made outside a vehicle based on the ultrasound and a vehicle control method based on the gesture is described in connection with embodiments of the present disclosure.

Figure 2:
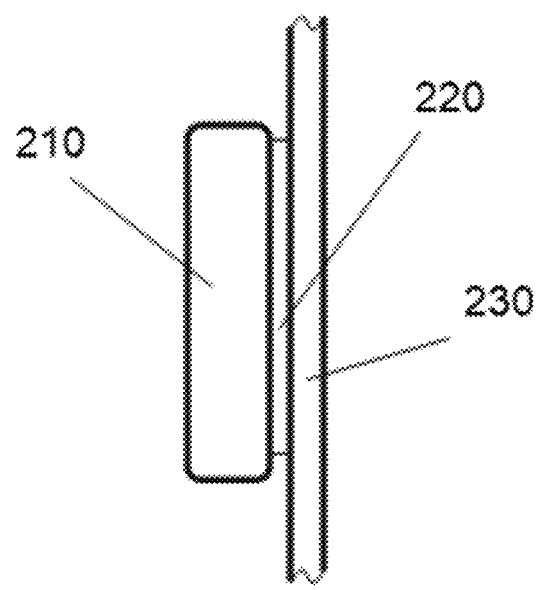
FIG. 2 is a schematic diagram showing a mounting position of an ultrasound array of a vehicle according to some embodiments of the present disclosure.
Figure 3:
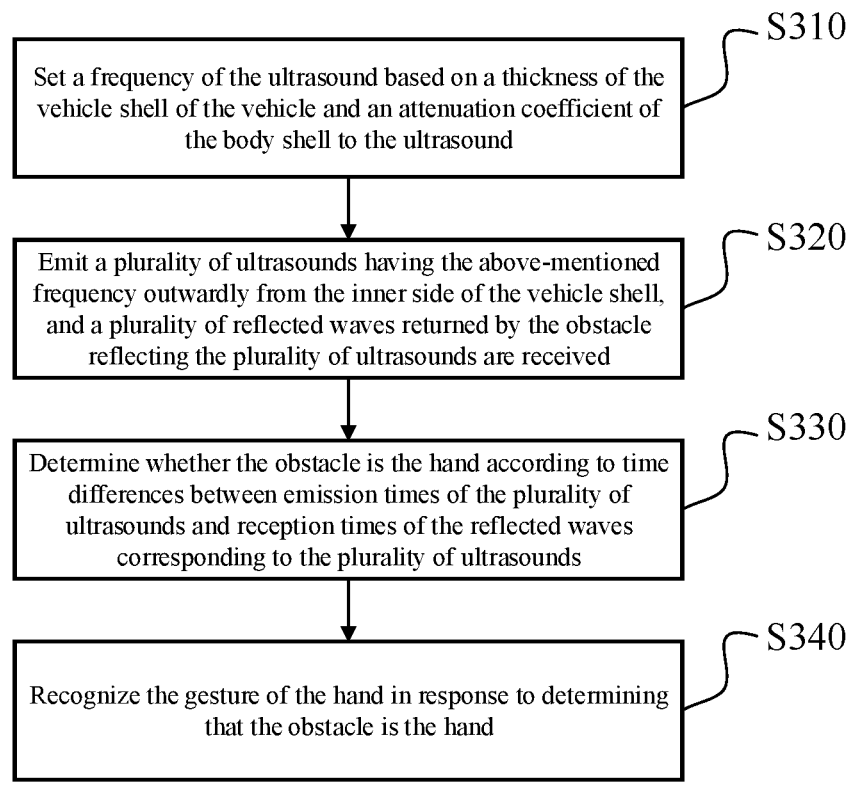
FIG. 3 is a schematic flowchart of a method recognizing a gesture made outside of a vehicle according to some embodiments of the present disclosure.

FIG. 1 is a schematic diagram showing a scene of recognizing a gesture made outside a vehicle according to some embodiments of the present disclosure. FIG. 2 is a schematic diagram showing a mounting position of an ultrasound array of a vehicle according to some embodiments of the present disclosure. FIG. 3 is a schematic flowchart of a method recognizing a gesture made outside a vehicle according to some embodiments of the present disclosure. A method of recognizing the gesture made outside the vehicle is described below with reference to FIG. 1 to FIG. 3.

In some embodiments, an ultrasound array 110 may be arranged inside a vehicle shell of a vehicle 100. For example, as shown in FIG. 1, the ultrasound array 110 is arranged on an inner side of a front door of the vehicle 100. However, although FIG. 1 shows the ultrasound array 110 arranged on the inner side of the front door of the vehicle 100, the present disclosure is not limited to this. A plurality of ultrasound arrays 110 may be arranged at a plurality of locations of the vehicle 100 without departing from the teaching and spirit of the present disclosure. For example, the plurality of ultrasound arrays 110 may be arranged on at least one position of an inner side of a rear door, an inner side of a front hood, an inner side of a rear hood, an inner side of a front bumper, an inner side of a rear bumper, or an inner side of a vehicle B-pillar. In some embodiments, the ultrasound arrays 110 may be arranged on some or all the positions listed above. Where the ultrasound arrays 110 are arranged at some or all the positions, the gesture outside the vehicle, and a vehicle component that is to be controlled pointed by the gesture of the user may be more accurately recognized in all directions. However, the present disclosure is not limited to this. The ultrasound array 110 may be only arranged on the inner side of the vehicle B-pillar or at any one position according to needs/cost consideration. In addition, the plurality of ultrasound arrays 110 may also be arranged at one of the plurality of positions listed above. For example, two, three, or more ultrasound arrays may be arranged on the inner side of the front door of the vehicle 100. In some embodiments, the ultrasound array may be a one-dimensional ultrasound array or a two-dimensional ultrasound array. However, an ultrasound array with any characteristics and operation modes may be applied without departing from the teachings of the present disclosure.

With further reference to FIG. 1, the ultrasound array 110 includes a plurality of ultrasound units 111. Each of the plurality of ultrasound units 111 may be a smallest unit that emits an ultrasound. For example, each ultrasound unit 111 may emit an ultrasound with a specific frequency. As shown in FIG. 1, in some embodiments, the ultrasound array 110 arranged on the inner side of the front door of the vehicle includes an array of 5×5 ultrasound units 111. That is, the ultrasound array 110 includes 25 ultrasound units 111. However, the present disclosure is not limited to this. Different numbers of ultrasound units may be arranged in one ultrasound array according to a mounting position of the ultrasound array, desired detection accuracy, and manufacturing cost.

In some embodiments, the plurality of ultrasound units 111 of the ultrasound array 110 may emit ultrasounds to the outside in a direction perpendicular to the ultrasound array (e.g., from the inside of the vehicle shell to the outside of the vehicle). Thus, when there is an obstacle nearby, the shape of the obstacle may be recognized. The obstacle may be determined to be a hand based on the shape of the obstacle. Then, a position and a gesture of the hand may be further obtained. A method of obtaining the gesture of the hand is described in detail with reference to FIG. 3. A method of obtaining the position of the hand is described in detail with reference to FIG. 4.

In some embodiments, by arranging the ultrasound arrays at one or more positions inside the vehicle shell, one or more ultrasound arrays may be covered by the vehicle shell. Thus, the ultrasound arrays may not be seen from the outside of the vehicle, which enhances integrity of an appearance of the vehicle to increase aesthetics and improves the strength of the vehicle shell to improve safety and/or reduce wind resistance. In addition, since the ultrasound arrays are arranged on the inner side of the vehicle shell, no hole needs to be arranged on the vehicle shell. Moreover, no gap may exist on the vehicle shell. Thus, a seal performance of the vehicle shell may be increased, and a manufacturing process of the vehicle shell and a vehicle assembly process may be simplified to reduce the manufacturing cost of the vehicle.

Referring to FIG. 2, in some embodiments, the ultrasound array 210 is attached to the inner side of the vehicle shell 230, for example, through a conductive rubber pad 220. In some embodiments, the conductive rubber pad 220 may include a material, which has an attenuation to the ultrasound of approximately 0, such as a solid hydrogel. That is, when the ultrasound passes through the material (e.g., solid hydrogel), the intensity of the ultrasound may hardly decrease. However, the present disclosure is not limited to this. Any kind or type of material may be used as the conductive pad as long as the material may be used to attach the ultrasound array 210 to the inner side of the vehicle shell 230 and hardly affect the intensity of ultrasound.

The method 300 of recognizing the gesture made outside the vehicle based on the ultrasound is described below with reference to FIG. 3.

Referring to FIG. 3, at S310, a frequency of the ultrasound is set based on a thickness of the vehicle shell of the vehicle and an attenuation coefficient of the body shell to the ultrasound.

In some embodiments, the ultrasound may have a penetration property. For example, the ultrasound may penetrate the vehicle shell. However, the vehicle shell may have an effect on the intensity of the ultrasound, for example, reducing the intensity of the ultrasound. The impact of the vehicle shell on the ultrasound may be related to the thickness of the vehicle shell and the attenuation coefficient of the vehicle shell to the ultrasound. The thicker the vehicle shell is, the more the intensity of the ultrasound is reduced after passing through the vehicle shell. In addition, the greater the attenuation coefficient of the vehicle shell to the ultrasound, the more the intensity of the ultrasound is reduced after passing through the vehicle shell. However, when the intensity of the ultrasound is too low, precision and accuracy of object detection may be affected. Therefore, the ultrasound of a specific frequency may need to be set to reduce the impact of the vehicle shell on the ultrasound while satisfying the detection precision. The following equation (1) provides a relationship between the ultrasound attenuation and the thickness of the vehicle shell, the attenuation coefficient of the vehicle shell to the ultrasound, and the frequency of the ultrasound:

$$A = \alpha \cdot t \cdot f \quad (1)$$

where A denotes the attenuation of the vehicle shell to the ultrasound, $\alpha$ denotes the attenuation coefficient of the vehicle shell to the ultrasound, t denotes the thickness of the vehicle shell, and f denotes the frequency of the ultrasound.

As shown in equation (1), when the attenuation A of the ultrasound by the vehicle shell is too large, the frequency f of the ultrasound may be reduced to reduce the reduction of the intensity of the ultrasound.

For example, assume that the attenuation coefficient $\alpha$ of the vehicle shell to ultrasound may be 10 dB/(cm·MHz), and the thickness of the vehicle shell may be 0.2 cm. If the attenuation A of the ultrasonic wave by the car shell needs to be set to be less than or equal to 10 dB, then according to equation (1), the frequency f of the ultrasound needs to be less than or equal to 5 MHz, such as 2 MHz or 4 MHz. However, the present disclosure is not limited to this. Those skilled in the art may set the attenuation A of the ultrasound by the vehicle shell with any threshold as needed. In addition, for different types of vehicles, when the attenuation A of the ultrasound by the vehicle shell is determined, the specific ultrasound frequency may be calculated according to the thicknesses of the vehicle shells of different vehicles and the attenuation coefficients of the vehicle shells to the ultrasound. Thus, the attenuation of ultrasound may be reduced, and the precision of the gesture recognition may be further ensured.

As mentioned above, the ultrasound can only be disturbed by another ultrasound of a similar frequency, but cannot be disturbed by factors such as weather, temperature, humidity, air pressure, light intensity, and electromagnetic radiation. Therefore, in order to reduce the disturbance of the ultrasound of a similar frequency in a surrounding area, a plurality of different ultrasound frequencies may be set. Thus, when the detection is disturbed, the frequency of the ultrasound may be changed to another frequency to prevent being affected by the surrounding environment. For example, when the ultrasound frequency obtained according to equation (1) needs to be less than or equal to 5 MHz, the ultrasound frequency may be preset to 4 MHZ, 3 MHz, 2 MHz, and 1 MHz. When the ultrasound is disturbed at a certain frequency (e.g., 4 MHz), the ultrasound frequency may be set to another frequency (e.g., 2 MHz) to avoid interference.

Figure 5:
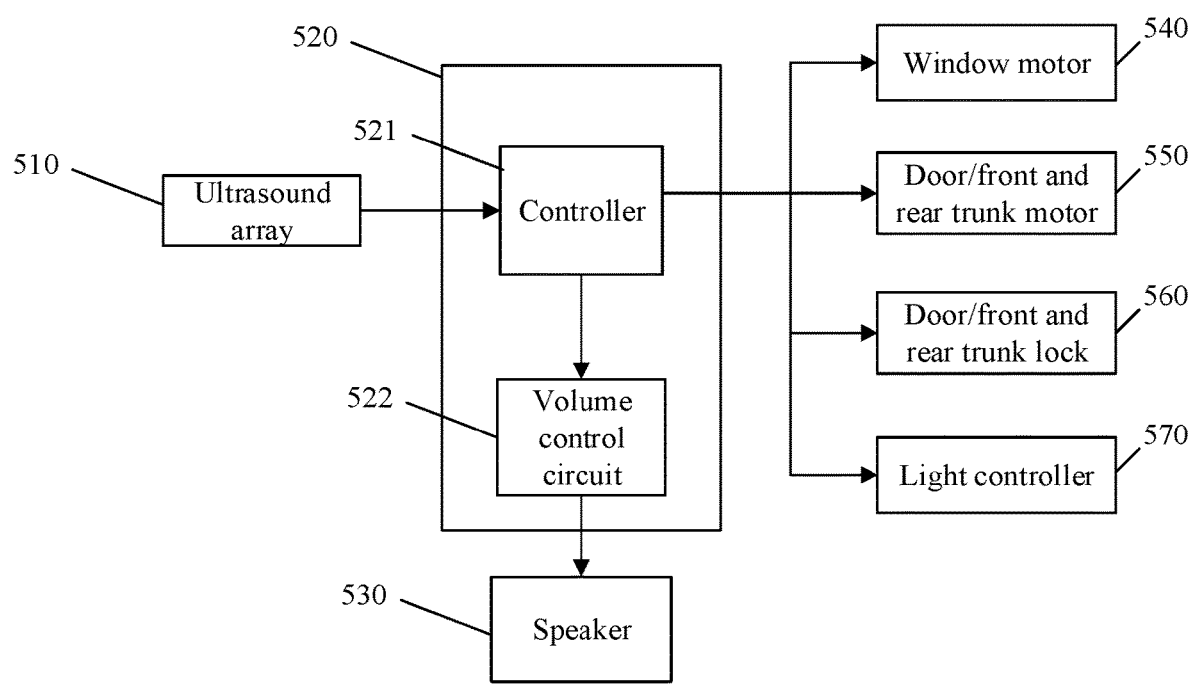
FIG. 5 is a schematic block diagram of a vehicle according to some embodiments of the present disclosure.

In embodiments of the present disclosure, the ultrasound array may obtain a parameter of the vehicle (e.g., the thickness t of the vehicle shell and the attenuation coefficient $\alpha$ of the ultrasound by the vehicle shell) through a transceiver device arranged in the ultrasound array. When the ultrasound array obtains the above parameter, the ultrasound array may be used to calculate a frequency f of a to-be-emitted ultrasound (e.g., a plurality of preset frequencies) according to the above parameters. Thus, the attenuation A of the ultrasound by the vehicle shell may be less than or equal to a predetermined threshold (e.g., 10 dB). However, the present disclosure is not limited to this. The ultrasound array may obtain the parameter (e.g., e.g., the thickness t of the vehicle shell and the attenuation coefficient $\alpha$ of the ultrasound by the vehicle shell) of the vehicle through another assembly of the vehicle. The frequency f of the to-be-emitted ultrasound may be set according to the obtained parameter. Thus, the frequency f may be transmitted to the ultrasound array. Then, the ultrasound unit of the ultrasound array may emit the ultrasound of the frequency f. With reference to FIG. 5, the process of obtaining the parameter of the vehicle and setting the frequency f of the ultrasound are described in detail.

At S320, a plurality of ultrasounds having the above-mentioned frequency are emitted outwardly from the inner side of the vehicle shell, and a plurality of reflected waves returned by the obstacle reflecting the plurality of ultrasounds are received.

In some embodiments, the plurality of ultrasound units of the ultrasound array arranged on the inner side of the vehicle shell may be configured to emit the plurality of ultrasounds to the outside of the vehicle, respectively. When the plurality of ultrasounds encounter an obstacle, a plurality of ultrasounds may be reflected. The plurality of ultrasound units may receive reflected waves corresponding to the ultrasounds emitted by the plurality of ultrasound units, respectively. In some embodiments, the frequency of the ultrasounds emitted by the plurality of ultrasound units may include one of the frequencies of the to-be-emitted ultrasounds obtained in process S310.

At S330, whether the obstacle is the hand is determined according to time differences between emission times of the plurality of ultrasounds and reception times of the reflected waves corresponding to the plurality of ultrasounds.

In some embodiments, since the obstacle is in a 3D shape, for each ultrasound unit of the plurality of ultrasound units, the time differences between the ultrasounds emitted by the ultrasound units and the reflected waves received by the ultrasound units may be determined, and a distance of each ultrasound unit of the plurality of ultrasound units to the obstacle may be obtained. Then, the location and shape of the obstacle may be determined based on the distance of each ultrasound unit of the plurality of ultrasound units to the obstacle. Then, whether the obstacle is the hand may be determined based on the shape of the obstacle. The shape of the obstacle may be recognized, and whether the obstacle is the hand may be determined in any manner without departing from the teaching and scope of the present disclosure. For example, the shape of the obstacle may be matched with the pre-stored hand shape data. When a matching degree is greater than or equal to a specific threshold, the obstacle may be determined to be the hand. In addition, when the obstacle in its entirety is recognized as a human body, an approximate position range of the hand may be further determined based on the shape of the human body. Thus, the hand may be located more quickly, and the gesture recognition may be performed.

At S340, the gesture of the hand is recognized in response to determining that the obstacle is the hand.

In embodiments of the present disclosure, the gesture of the hand may be determined by detecting information of a trajectory and motion of the hand. In the present disclosure, the trajectory of the hand may refer to an entire path through which the detected hand moves in space. The motion of the hand may refer to a detected posture change of the hand. The method for recognizing the gesture based on the trajectory and motion of the hand is described below with reference to specific examples.

For example, when the hand of the user swings downward, the trajectory of the hand may be determined to swing downward. Since the posture of the hand does not change, no hand motion may be detected. Thus, the gesture of the hand may be determined to be a downward swing. In another example, when the user waves the hand, since the hand does not move spatially, the trajectory of the hand may not be detected. The posture of the hand may be detected to be waving the hand. Thus, the gesture of the hand may be determined to be waving the hand. In yet another example, when the hand of the user swings downward and continuously makes a fist, the trajectory of the hand may be determined to be a downward swing. The posture of the hand may be detected to be making the fist. Then, the gesture of the hand may be determined to be the downward swing and making the fist. In addition, the gesture of the hand may also be determined by periodically detecting information such as the trajectory and motion of the hand. For example, the precision and accuracy of gesture recognition may be further improved by periodically detecting the trajectory and motion of the hand to determine the gesture of the hand.

In the method of recognizing the gesture made outside the vehicle of embodiments of the present disclosure, the gesture of the hand of the user may be detected by the ultrasounds having the specific frequency emitted by the plurality of ultrasound units of the ultrasound array. The frequency of the to-be-emitted ultrasound may be determined based on the thickness of the vehicle shell and the attenuation of the ultrasound by the vehicle shell. Thus, the impact of the vehicle shell on the ultrasound may be reduced while the gesture made outside the vehicle is recognized.

Figure 4:
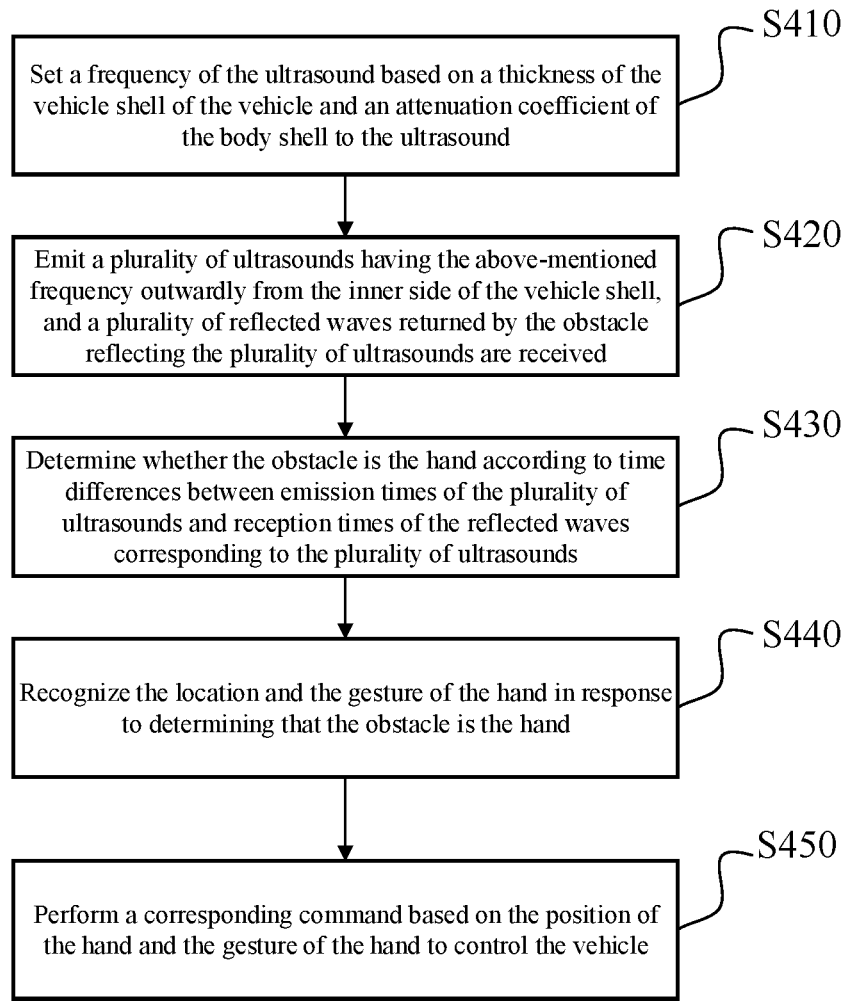
FIG. 4 is a schematic flowchart of a vehicle control method according to some embodiments of the present disclosure.

FIG. 4 is a schematic flowchart of a vehicle control method 400 according to some embodiments of the present disclosure. In the method shown in FIG. 4, processes S410 to S440 may be substantially the same as processes S310 to S340 with reference to FIG. 3, and thus detailed descriptions thereof are omitted.

Referring to FIG. 4, in the method 400, the position of the hand may be determined, and the gesture of the hand may be recognized through processes S410 to S440. The process of determining the position of the hand is described in detail below. For example, in some embodiments, when the hand of the user is 0.3 m away from a front left door and 0.5 m away from a front bumper, since the ultrasound arrays on the inner side of the front door and the inner side of the front bumper may detect the hand of the user, the position of the hand may be determined to be closer to a certain ultrasound array. For example, since the hand is detected to be 0.3 m away from the ultrasound array on the inner side of the vehicle front door by the ultrasound array on the inner side of the front door, and the hand is detected to be 0.5 m away from the ultrasound array on the inner side of the front bumper by the ultrasound array on the inner side of the front bumper, the position of the hand may be determined to be near the vehicle front door. In addition, in some other embodiments, when only the ultrasound array on the inner side of the vehicle front door detects the hand of the user, the position of the hand may be directly determined to be near the vehicle front door.

At S450, a corresponding command is performed based on the position of the hand and the gesture of the hand to control the vehicle.

In some embodiments, after the position and the gesture of the hand outside the vehicle are obtained, the vehicle may be controlled accordingly based on the position and the gesture of the hand. In some embodiments, the vehicle may be woken based on a specific position and a specific gesture of the hand. The specific position and the specific gesture may be preset. For example, when the vehicle is off (e.g., not yet woken), the user may continuously make a first at the head of the vehicle. When the vehicle detects the hand at the head of the vehicle and the gesture of "continuously making a fist", the vehicle may start by itself (waking up), and the user may not need to control the vehicle to start through the vehicle key or smartphone. Thus, the user manipulation experience may be improved, and operation convenience may be improved. As an example above, the hand position "head of the vehicle" and the gesture "continuously making a fist" are provided. However, the user may preset the specific hand position and the specific gesture corresponding to starting the vehicle as needed. Then, the user may awake the vehicle without carrying any electronic apparatus to realize the interaction with the vehicle to improve the intelligence and convenience of the control.

In some other embodiments, when the vehicle is started (e.g., woken), one or a plurality of to-be-controlled vehicle assemblies may be determined based on the position and the gesture of the hand of the user. The final to-be-controlled vehicle assembly may be determined based on the one or the plurality of to-be-controlled vehicle assemblies and the gesture of the hand, and the operation corresponding to the gesture may be performed. For example, in some embodiments, where the hand of the user is located near a left front door and swings downward, the to-be-controlled vehicle assembly may be determined to be the left front door or a left front window. In addition, the trajectory of the hand may be detected to be a downward swing. Since the posture of the hand does not change, no hand motion may be detected. Then, the gesture of the hand may be determined to be the downward swing. Since no command corresponding to the downward swing at the left front door exists in the pre-stored commands, and only a command corresponding to the downward swing at the left front window exists in the pre-stored commands, the final to-be-controlled vehicle assembly may be determined to be the left front window of the vehicle. Since the gesture is the downward swing, the left front window may be controlled to descend according to the command.

In some other embodiments, when the hand of the user is 3 m away from the head of the vehicle and waves, the position of the hand may be detected to be near the head of the vehicle. Thus, the to-be-controlled vehicle assembly may be the front hood, a headlight, or a vehicle drive assembly. The hand trajectory may not be detected, and the gesture of the hand may be detected to be hand waving. Then, the gesture of the hand may be determined as the hand waving at the head of the vehicle. Since a command corresponding to the front hood+the hand waving and a command corresponding to the headlight+the hand waving do not exist in the pre-stored commands, and only a command corresponding to the vehicle drive assembly+the hand waving exists in the pre-stored commands, the final to-be-controlled vehicle assembly may be determined to be the vehicle drive assembly. Since the gesture of the hand is the hand waving, the vehicle may be controlled to drive forward for a certain distance based on the command.

A brief description of some other embodiments may be given below. For example, in some other embodiments, when the hand of the user is behind the rear bumper and swings upward, the to-be-controlled vehicle assembly may be recognized as a rear trunk hood. The rear trunk hood of the vehicle may be controlled to open upwardly.

In addition, for example, when the hand is positioned by a specific door and swings outwardly, the to-be-controlled vehicle assembly may be recognized as a door. A specific door may be opened. When the hand is positioned by the specific door and swings inwardly, the to-be-controlled vehicle assembly may be recognized as the door, and the specific door may be closed. In addition, when the command corresponding to the gesture is opening the specific door, a distance from the user outside the vehicle to the door may be further determined. The corresponding door may be opened by ensuring that the door does not collide with the user following the door opening trajectory.

For example, when the hand is by the front trunk and swings upwardly, the to-be-controlled vehicle assembly may be recognized as the front hood, and the front hood may be opened. When the hand is by the front trunk and swings downwardly, the to-be-controlled vehicle assembly may be recognized as the front trunk hood, and the front trunk hood may be closed.

For example, when the hand is by the vehicle, is flat, and is slowly lifted upwardly, the to-be-controlled vehicle assembly may be recognized as an external speaker, and the playback volume of the external speaker may be gradually increased. When the hand is by the vehicle, is flat, and is slowly lowered downwardly, the to-be-controlled vehicle assembly may be recognized as the external speaker, and the playback volume of the external speaker may be gradually reduced.

For example, when the hand is by the vehicle, is held upright, and moves slowly to the left, the to-be-controlled vehicle assembly may be recognized as a music control system, and the music being played by the vehicle may be switched to previous music. When the hand is by the vehicle, is held upright, and moves slowly to the right, the to-be-controlled vehicle assembly may be recognized as a music control system, and the music being played by the vehicle may be switched to next music.

For example, when the hand is in front of the vehicle, and the finger points to the headlight and clicks, the to-be-controlled vehicle assembly may be recognized as the headlight, and the headlight of the vehicle may be controlled to switch among low beam, high beam, and off.

In some other embodiments, when the vehicle starts (e.g., woken), one or a plurality of to-be-controlled vehicle assemblies may be determined based on the position and a pointing direction of the gesture of the hand of the user. The to-be-controlled vehicle assembly may be controlled to perform the operation corresponding to the gesture. For example, if the hand of the user is detected at the ultrasound array arranged on the inner side of the vehicle B-pillar, and the gesture of the hand points to a right side of the B-pillar, the gesture of the hand may be determined to point to the door or the window on the right side of the B-pillar.

In some other embodiments, the one or the plurality of to-be-controlled vehicle assemblies may be determined based on the position and the gesture combination of the hand of the user, and the to-be-controlled vehicle assemblies may be controlled to perform one or more operations corresponding to the gesture combination.

In some other embodiments of the present disclosure, when a plurality of gestures made outside the vehicle exist within a same time period, and commands corresponding to the plurality of gestures contradict each other, the vehicle may not execute the commands. For example, when two hands by the window of the vehicle exist simultaneously, one of the hands swings upwardly, and the other one of the hands swings downwardly. Since the commands corresponding to the gestures of the two hands contradict each other, the vehicle may not execute any operation. Therefore, different gesture manipulation effects may be achieved according to different positions of the user outside the vehicle. The intelligence and convenience of the control may be improved.

The above describes several different scenes of how to control the vehicle based on the position and gesture of the hand. However, the present disclosure is not limited to this. The positions and gestures of the hand corresponding to the different commands may be pre-set as needed. Thus, the specific assembly of the vehicle may be controlled to perform the corresponding operation.

In addition, the above gesture may be detected by a two-dimensional (2D) ultrasound array. However, in some specific situations (e.g., a simple left or right swipe gesture), the user gesture may be recognized through a one-dimensional (1D) ultrasound array, and the vehicle may be controlled accordingly based on the gesture. However, the present disclosure is not limited to this. Within the teaching and scope of the present disclosure, in other situations, an ultrasound array of a higher dimension or with another characteristic may be configured to detect the hand of the user and recognize the gesture of the user.

In the vehicle control method of embodiments of the present disclosure, the position and gesture of the hand of the user may be detected by the ultrasounds having the specific frequency emitted by the plurality of ultrasound units of the ultrasound array. The frequency of the to-be-emitted ultrasounds may be determined based on the thickness of the vehicle shell and the attenuation of the ultrasound by the vehicle shell. Thus, the impact of the vehicle shell on ultrasounds may be reduced while the gesture made outside the vehicle is recognized. In addition, since the user does not need to actively obtain the control authority, does not need to have any substantial contact with the vehicle, or control the vehicle through a mobile apparatus. Thus, the user experience may be improved, and the operation of controlling the vehicle may be simplified.

In addition, since the ultrasound array is located on the inner side of the vehicle shell, the appearance may be simplified, and the manufacturing cost may be reduced.

FIG. 5 is a schematic block diagram of a vehicle according to some embodiments of the present disclosure. With reference to FIG. 5, the description of the assemblies or the processes same as the assemblies or processes of other embodiments may be omitted or simplified.

The vehicle includes a vehicle shell and a vehicle system 500. With reference to FIG. 5, the vehicle system 500 includes an ultrasound array 510, a host system 520, a speaker 530, a window motor 540, a door/front and rear trunk motor 550, a door/front and rear trunk lock 560, and a light controller 570. The host system 520 includes a controller 521 and a volume control circuit 522. However, the assemblies included in the vehicle system 500 are not limited to those shown in FIG. 5. The vehicle 500 may also include other assemblies not described below, for example, a vehicle drive assembly. In addition, the block diagrams shown in FIG. 5 are merely exemplary. Different assemblies may be arranged in the same block diagram as needed, or the assemblies in the same block diagram may be arranged in different block diagrams.

The vehicle assemblies shown in FIG. 5 may be described in detail below.

In embodiments of the present disclosure, the controller 521 of the host system 520 may read the parameter of the vehicle (e.g., the thickness of the vehicle shell and the attenuation coefficient of the vehicle shell to the ultrasound). When the controller 521 obtains the parameter, the controller 521 may calculate the specific frequencies of the to-be-emitted ultrasounds (e.g., a plurality of preset specific frequencies) according to the parameter. Thus, the attenuation of the ultrasound by the vehicle shell may be less than or equal to a predetermined threshold (e.g., 10 dB). The controller 521 may transmit the specific frequency to the ultrasound array 510. Thus, the ultrasound unit of the ultrasound array 510 may emit the ultrasounds having the specific frequency.

In some other embodiments of the present disclosure, the ultrasound array 510 may be configured to read the parameter of the vehicle (e.g., the thickness of the vehicle shell and the attenuation coefficient of the vehicle shell to the ultrasound), and calculate the frequencies of the to-be-emitted ultrasounds according to the parameter.

In embodiments of the present disclosure, the ultrasound unit of the ultrasound array 510 may emit the ultrasound with the specific frequency to the outside of the vehicle and receive reflected waves reflected back by the obstacle. The controller 521 may be configured to obtain, from the ultrasound array 510, the emission time of each ultrasound unit emitting the ultrasounds and the reception time of the reflected waves. Thus, the distance of each ultrasound unit to the obstacle may be determined based on the time differences between the emission times of the ultrasounds of each ultrasound unit and the reception times of the reflected waves corresponding to the ultrasounds. Whether the obstacle is the hand may be determined according to the distance of each ultrasound unit to the obstacle. When the controller 521 determines that the obstacle is the hand, the controller 521 may further determine the position and the gesture of the hand. In some embodiments, the controller 521 may be configured to recognize the position and the gesture of the hand by periodically obtaining the position, trajectory, and motion of the hand.

In embodiments of the present disclosure, the ultrasound array 510 may be arranged on at least one of the inner side of the rear door, the inner side of the front hood, the inner side of the rear hood, the inner side of the front bumper, the inner side of the rear bumper, or the inner side of the B-pillar of the vehicle. The ultrasound array 510 may also be attached to the vehicle shell by a conductive rubber pad.

Several application scenarios of controlling the vehicle through the gesture are provided below in connection with FIG. 5.

In some embodiments, when the controller 521 recognizes that the hand is by the window and the corresponding gesture, the controller 521 may control the window motor 540 to ascend or descend the window. In some other embodiments, when the controller 521 recognizes that the hand is by the door and the corresponding gesture, the controller 521 may control the door/front and rear trunk motor 550 or the door/front and rear trunk lock 560 to open and close the door or lock/unlock door. In some other embodiments, when the controller 521 recognizes that the hand is by the front and rear trunks and the corresponding gesture, the controller 521 may control the door/front and rear trunk motor 550 or the door/front and rear trunk lock 560 to open and close the front and rear trunks or lock/unlock the front and rear trunks. When the controller 521 recognizes that the hand is by the light and the corresponding gesture, the controller 521 may control the light controller 570 to switch the light among low beam, high beam, or off. When the controller 521 recognizes that the hand is by the vehicle and the gesture related to controlling the music, the controller 521 may control the volume control circuit 522 to switch the music to the previous/next track, or to increase or decrease the music playback volume of the speaker 530 (e.g., an external speaker). However, the present disclosure is not limited to this. Other assemblies of the vehicle may be controlled by the hand at different positions and different gestures to realize the corresponding function as needed.

As described above, by arranging the ultrasound array inside the vehicle, the appearance of the vehicle may be made clean, and the manufacturing process may be simplified to reduce the manufacturing cost. In addition, by setting the specific emission frequency of the ultrasound, the impact of the vehicle shell on the ultrasound may be reduced while the detection accuracy is satisfied. Further, when the gesture made outside the vehicle is detected by the ultrasound array, the user may conveniently control the vehicle through the gesture and may not need to control the vehicle with substantial contact with the vehicle or control the vehicle through a smart device. Thus, the operation experience may be improved, and the vehicle control operation may be simplified.

The above description is merely embodiments of the present disclosure and description of the applied technical principles. Those skilled in the art should understand that the scope of the present disclosure is not limited to the technical solutions formed by the specific combination of the above-mentioned technical features, and should also cover, without departing from the technical concept, other technical solutions formed by any combination of the technical features or the equivalent features of the technical features. For example, the technical solution may be formed by replacing the above features with the technical features of the present disclosure (but not limited to) with similar functions.

What is claimed is:

1. A method for recognizing a gesture made outside a vehicle comprising:
   setting a frequency of an ultrasound based on a thickness of a vehicle shell of the vehicle and an attenuation coefficient of the vehicle shell, such that an attenuation of the ultrasound by the vehicle shell is less than or equal to a predetermined threshold;
   emitting a plurality of ultrasounds having the frequency from an inner side of the vehicle shell, and receiving a plurality of reflected waves returned by an obstacle reflecting the plurality of ultrasounds;
   determining whether the obstacle is a hand according to time differences between emission times of the plurality of ultrasounds and reception times of the plurality of reflected waves corresponding to the plurality of ultrasounds;

determining a location of the hand and recognizing the gesture of the hand in response to determining that the obstacle is the hand; and performing a command based on the location of the hand and the gesture of the hand to control the vehicle.

2. The method according to claim 1, wherein setting the frequency of the ultrasound based on the thickness of the vehicle shell of the vehicle and the attenuation coefficient of the vehicle shell to the ultrasound includes:

obtaining the thickness of the vehicle shell and the attenuation coefficient of the vehicle shell to the ultrasound; and selecting the frequency of the ultrasound that is to be emitted from a plurality of predetermined candidate ultrasound frequencies according to the thickness and the attenuation coefficient.

3. The method according to claim 2, wherein the setting the frequency of the ultrasound further comprises changing the frequency of the ultrasound to another of the plurality of predetermined candidate ultrasound frequencies in response to hand detection being disturbed.

4. The method according to claim 1, wherein emitting the plurality of ultrasounds having the frequency from an inner side of the vehicle shell includes:

emitting the plurality of ultrasounds by a plurality of ultrasound units located on the inner side of the vehicle shell.

5. The method according to claim 4, wherein determining whether the obstacle is the hand according to the time differences between the emission times of the plurality of ultrasounds and the reception times of the plurality of reflected waves corresponding to the plurality of ultrasounds includes:

determining a distance between each ultrasound unit of the plurality of ultrasound units and the obstacle based on a time difference between an emission time of each ultrasound emitted by the plurality of ultrasound units and a reception time of a reflected wave corresponding to the ultrasound; and determining whether the obstacle is the hand according to the distance.

6. The method according to claim 4, wherein a mounting position of the plurality of ultrasound units includes at least one of an inner side of a vehicle door, an inner side of a vehicle front hood, an inner side of a vehicle rear hood, an inner side of a bumper, or an inner side of a vehicle B-pillar.

7. The method according to claim 6, wherein the plurality of ultrasound units are attached to the vehicle shell by a conductive rubber pad.

8. The method according to claim 1, wherein recognizing the gesture of the hand includes:

recognizing the gesture of the hand by determining a trajectory and a motion of the hand.

9. The method according to claim 8, wherein recognizing the gesture of the hand by determining the trajectory and the motion of the hand includes:

recognizing the gesture of the hand by periodically determining the trajectory and the motion of the hand.

10. The method according to claim 1, wherein performing the command based on the location of the hand and the gesture of the hand to control the vehicle includes:

in response to the vehicle not being awake, waking the vehicle based on the specific location of the hand and the specific gesture of the hand, the waking the vehicle comprising switching the vehicle from an off state to a started state.

11. The method according to claim 1, wherein performing the command based on the location of the hand and the gesture of the hand to control the vehicle includes:

in response to the vehicle being awake, determining a to-be-controlled vehicle assembly based on the location of the hand and the gesture of the hand, and controlling the vehicle based on the gesture of the hand to perform an operation corresponding to the command.

12. The method according to claim 1, wherein the location of the hand is determined based on a location of an ultrasound array that has a shortest distance to the hand among a plurality of ultrasound arrays.

13. The method according to claim 11, wherein the determining the to-be-controlled vehicle assembly based on the location of the hand and the gesture of the hand further comprises determining one or more first to-be-controlled vehicle assemblies based on the location of the hand, and the to-be-controlled vehicle assembly is determined based on the one or more first to-be-controlled vehicle assemblies and the gesture of the hand.

14. The method according to claim 13, wherein the to-be-controlled vehicle assembly is determined based on matching the gesture of the hand against at least one pre-stored command associated with each of the one or more first to-be-controlled vehicle assemblies.

15. A vehicle comprising:

a vehicle shell;

at least one ultrasound array located on an inner side of the vehicle shell, and the at least one ultrasound array emitting a plurality of ultrasounds with a specific frequency to outside of the vehicle shell and receiving a plurality of reflected waves reflected back by an obstacle; and a controller communicatively connected to the at least one ultrasound array and configured to:

set the specific frequency of the plurality of ultrasounds based on a thickness of the vehicle shell and an attenuation coefficient of the vehicle shell, such that an attenuation of the plurality of ultrasounds by the vehicle shell is less than or equal to a predetermined threshold;

determine whether the obstacle is a hand according to time differences between emission times of the plurality of ultrasounds and reception times of the plurality of reflected waves corresponding to the plurality of ultrasounds;

determine a location of the hand and recognize a gesture of the hand in response to determining that the obstacle is the hand; and perform a command based on the location of the hand and the gesture of the hand to control the vehicle.

16. The vehicle according to claim 15, wherein the controller is further configured to:

set the specific frequency of the plurality of ultrasounds based on the thickness of the vehicle shell and the attenuation coefficient of the vehicle shell, an attenuation of the plurality of ultrasounds by the vehicle shell being less than or equal to a predetermined threshold.

17. The vehicle according to claim 15, wherein the controller is further configured to:

obtain the thickness of the vehicle shell and the attenuation coefficient of the vehicle shell to the plurality of ultrasounds; and select the specific frequency of the plurality of ultrasounds that are to be emitted from a plurality of predetermined candidate ultrasound frequencies according to the thickness and the attenuation coefficient.

18. The vehicle according to claim 15, wherein a mounting position of the plurality of ultrasound units includes at least one of an inner side of a vehicle door, an inner side of a vehicle front hood, an inner side of a vehicle rear hood, an inner side of a bumper, or an inner side of a vehicle B-pillar.

19. The vehicle according to claim 15, wherein the plurality of ultrasound units are attached to the vehicle shell by a conductive rubber pad.

20. The vehicle according to claim 15, wherein the controller is further configured to:
   recognize the gesture of the hand by determining a trajectory and a motion of the hand.

* * * * *